United States Patent
Ross, deceased

[11] 3,905,446
[45] Sept. 16, 1975

[54] SELF-PROPELLED SEISMIC SIGNAL GENERATOR

[75] Inventor: Walter T. Ross, deceased, late of Houston, Tex., by Elizabeth T. Ross, executrix

[73] Assignee: Western Geophysical Company of America, Houston, Tex.

[22] Filed: June 8, 1973

[21] Appl. No.: 368,403

Related U.S. Application Data

[63] Continuation of Ser. No. 159,911, July 6, 1971, abandoned.

[52] U.S. Cl. .............................................. 181/114
[51] Int. Cl.² .......................................... G01V 1/04
[58] Field of Search............ 181/.5 XC, .5 MV, 114, 181/119; 180/50

[56] References Cited

UNITED STATES PATENTS

| | | | |
|---|---|---|---|
| 3,374,853 | 3/1968 | Kilmer | 181/.5 VM |
| 3,568,778 | 3/1971 | Swisher | 180/56 |

*Primary Examiner*—Malcolm F. Hubler
*Assistant Examiner*—G. E. Montone
*Attorney, Agent, or Firm*—Michael P. Breston

[57] ABSTRACT

A seismic signal generator is provided with self-contained motive-power and propelling means to facilitate movement of same from one predetermined location to another. The supporting frame for the generator is especially articulated. Hydraulically powered propulsion means are provided. When on location, the generator's propulsion means provides a static mass to couple a base plate to the earth's surface.

2 Claims, 4 Drawing Figures

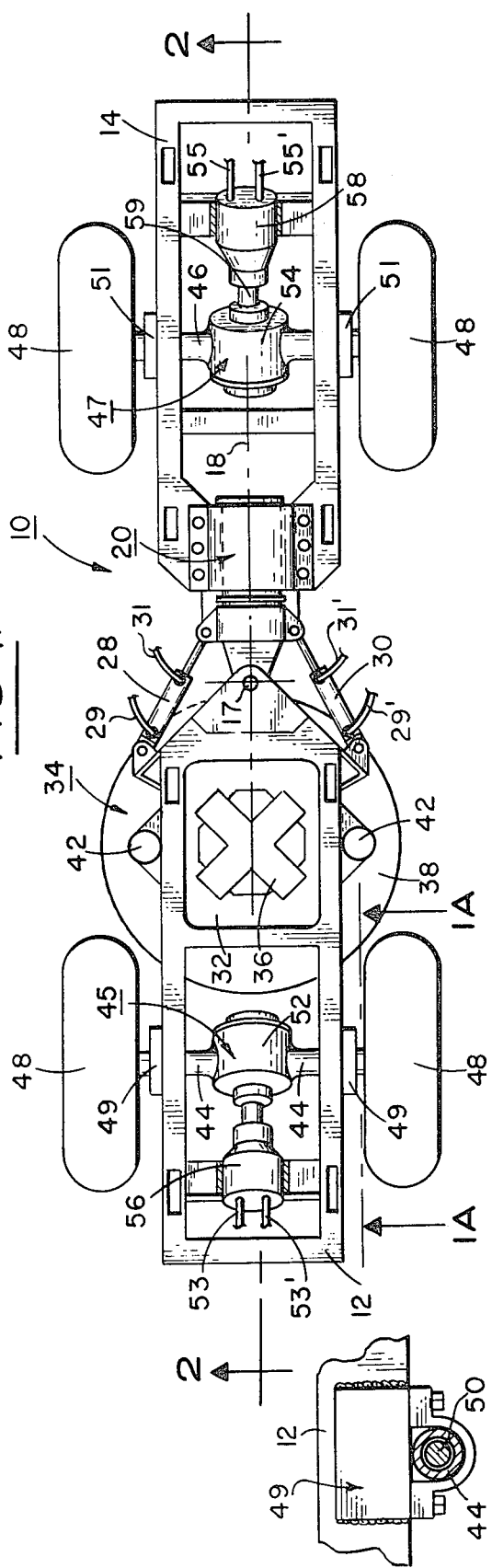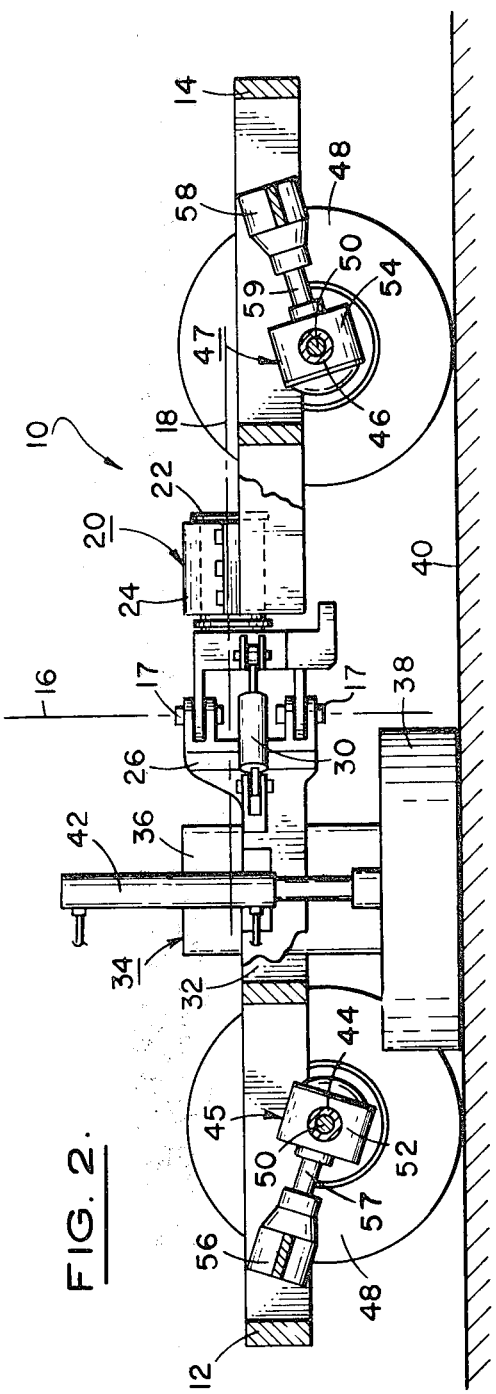
Walter T. Ross (Deceased),
Elizabeth T. Ross (Executrix),
INVENTOR.
BY
MICHAEL P. BRESTON
ATTORNEY.

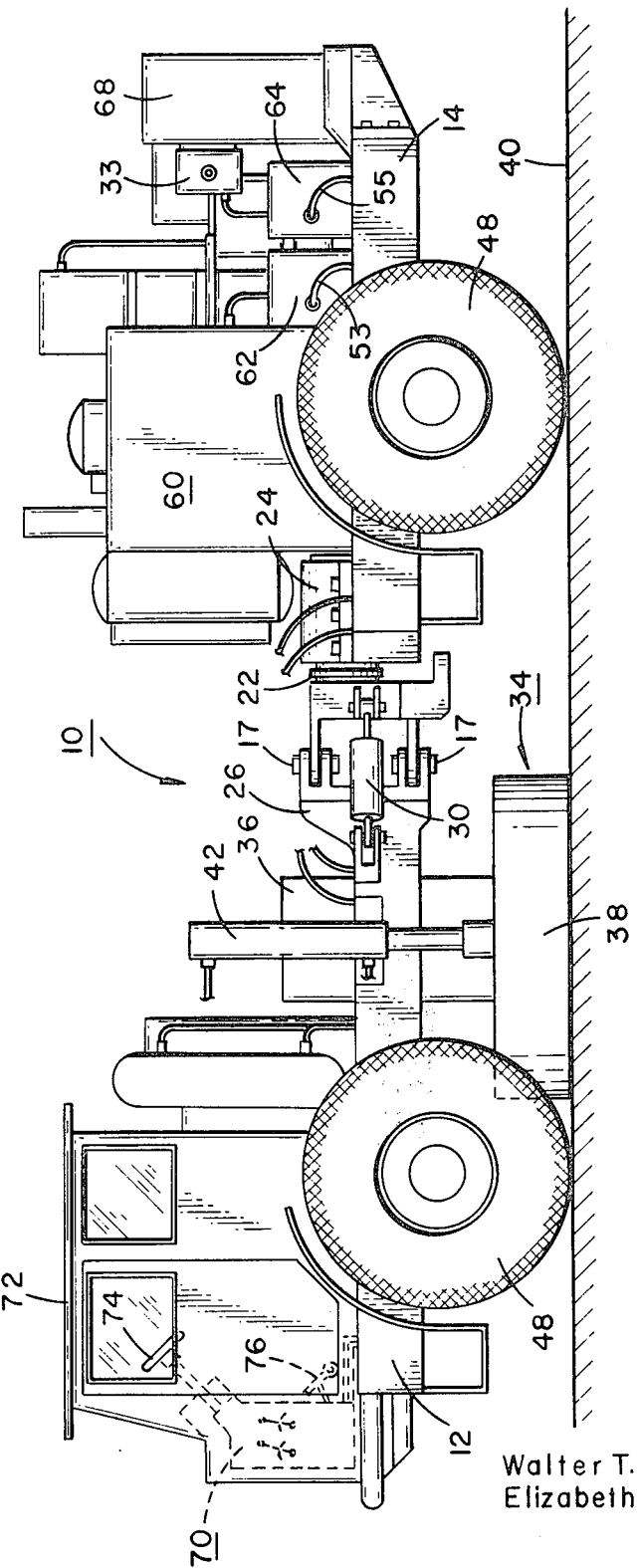

SELF-PROPELLED SEISMIC SIGNAL GENERATOR

This is a continuation of Ser. No. 159,911 filed July 6, 1971, now abandoned.

BACKGROUND OF THE INVENTION

This invention relates to seismographic exploration wherein a seismic signal generator is used to inject a seismic signal into the earth. Travelling downwardly, the seismic signal is reflected from underlying strata and returns to the surface. Sensitive transducers on the earth's surface receive the reflected signals and convert them to electrical signals. The electrical signals are then amplified and recorded. After the end of a cycle of signal-injection, reception, and recordation, the generator, transducers, and recording apparatus are moved to a new location. The process is then repeated at each new location.

Seismic signal generators may be of the vibrator type, the impulsive type and others well known to the art. In any case, such generators are very large and heavy. They require special vehicles for their transportation from location to location.

Various generator carriers are known. The purpose of such a carrier is first to transport the generator from one specified location to another. Secondly, the carrier provides a portion of its weight, as a static load, to firmly couple a generator base plate to the ground at each location to be surveyed. In the past, conventional vehicles, such as trucks, have been used as carriers, as shown in U.S. Pat. No. 3,306,391. It was found that the location of the drive shaft adversely interfered with the positioning of the generator. Structural design of the generator was much complicated by the need to straddle the drive shaft in order to allow the base plate of the generator to contact the ground.

The seismic signal generator together with its ancillary equipment is very heavy. As a result trucks used as generator carriers were of necessity very large. As is well known in the seismographic art, conventional, wheeled trucks are of little use in off-road operations or in hostile terrain where the bulk of the world's exploration is being carried out. For this severe service, other types of carriers were designed.

Kilmer's U.S. Pat. No. 3,295,630 shows an earthmover-type vehicle for use in transporting a seismic signal generator. The generator and other equipment needed for its operation were transported on a rear, trailed unit. Although such a vehicle is more suited to off-road operations than is a conventional truck, the earthmover was easily bogged down in swampy or sandy areas because only two, front drive-wheels were provided. Additionally, the vehicle was very unwieldy and subject to capsizing.

Accordingly, seismic signal generator carriers were adaptations of existing conventional vehicles. The adaptations proved to be clumsy and unsatisfactory for sustained routine use in off-road service. For cross-country operations, a rigid bed frame is undesirable. In rough terrain strain due to torsional forces between front and rear supports of a rigid bed may cause the fracturing of the framework. Furthermore, As is well known, mechanical drives are inefficient at low speeds whereby tractive effort is reduced.

SUMMARY OF THE INVENTION

It is an object of this invention to provide a self-propelled seismic signal generator (hereafter sometimes referred to as "unit," for brevity) which is highly maneuverable and specifically adapted for seismographic exploration service, both on-road and off-road.

The generator is mounted on a bed frame which is articulated about its approximate mid-point.

Means are provided to couple a base plate of the generator to the ground when on location.

Each end of the articulated bed frame is supported by a propulsion means, generally a pair of wheels. Independently powered hydraulic drives are provided for the front and rear propulsion means. By using a separate hydraulic pump for each hydraulic motor attached to a propulsion drive, each propulsion drive is made independent of the other.

The unit is steered by rotating one end relative to the other end about a vertical axis at the point of articulation. Rotation is accomplished under operator control by means of suitable hydraulic pistons.

The unit is steered without the need for physically turning a pair of wheels relative to the bed frame. Oversized, dual tires can be used on both drive axles to provide extra flotation in swampy, sandy or other hostile environments.

Since the vertical axis of articulation is substantially midway between the front and rear propulsion means, the radius of turn of both pairs of propulsion means is substantially identical. The rear wheels always track in the same path taken by the front wheels. Only one set of ruts are cut in wet ground, thereby minimizing ecological damage to the environment.

BRIEF DESCRIPTION OF THE DRAWINGS

FIG. 1 is a top view of the bed of the self-propelled seismic signal generator of this invention;

FIG. 1A is a section along line 1A—1A showing attachment of the propelling means to a support point on the bed frame;

FIG. 2 is a sectional view on line 2—2 in FIG. 1; and

FIG. 3 is a side view in elevation of the overall unit with its major component parts.

In the drawings is shown a self-propelled seismic signal generator, generally designated as 10. It includes two bed frames 12 and 14. Bed frames 12 and 14 are interconnected to allow relative rotation about a vertical axis 16 extending through a pivot 17 and to allow relative rotation about a longitudinal axis 18 extending through a bearing, generally designated as 20.

Bearing 20 has an inner race 22 and an outer sleeve or race 24. It will be noted that the two bed frames 12 and 14 cannot rotate about a horizontal transverse axis because of the fork configuration 26 which allows rotation about the vertical and the longitudinal axis only.

Steering of the unit is accomplished by rotating bed frames 12 and 14 relative to each other about vertical axis 16 using a pair of steering cylinders 28 and 30 which are hydraulically powered and operator controlled. Hydraulic fluid under pressure is supplied by hydraulic lines 29, 29' and return lines 31, 31' which are connected to an auxiliary pump 33.

Each of bed frames 12 and 14 is of substantially rectangular design with longitudinal and cross beams, as required from a structural point of view. The front section 12 defines an open area 32 to accommodate a seismic signal generator, generally designated as 34. In the drawings, it is illustrated as a seismic vibrator 36 having a base plate 38 for coupling with the ground 40. The vibrator 36 is retracted or lowered to engage the ground by hydraulic cylinders 42.

Each bed frame 12 or 14 is supported by at least one propulsion means at support points 49, 51 substantially equidistant from vertical axis 16. The propulsion means, generally designated as 45 and 47, consist of axle housings 44 and 46. At the outer extremities of each axle housing are mounted, in conventional manner, wheels and tires 48. Of course other propulsion means such as flexible, endless crawler-track means could be furnished for use in arctic regions. Wheels 48 are conventionally connected by axle means 50 to differential gears in gear boxes 52 and 54. Propulsion-drive means such as hydraulic motors 56 and 58 are provided. The output shafts 57, 59 of each motor 56 or 58 is coupled to the input shafts of differential gear box 52 or 54 in a conventional manner.

Referring more particularly to FIG. 3, there is provided a primary power source such as a diesel engine shown generally as 60. Diesel engine 60 drives two secondary power sources such as hydraulic pumps 62 and 64. Hydraulic pumps 62 and 64 supply hydraulic power to drive motors 56 and 59 via pressure lines 53 and 55 and return lines 53', 55'. Each propulsion means is now seen to be independently powered. Cooling radiators 68 provide the necessary cooling for the hydraulic fluid.

An important feature of this invention is the fact that separate pumps supply hydraulic power to drive motors 56 and 58. Without separate pumps, if one pair of wheels were stalled, all of the hydraulic power would be diverted to the stalled wheel-pair. This diversion would reduce or completely eliminate any tractive effort on the part of the other pair of drive wheels. By use of independent pumps and motors, maximum tractive effort from both axles is available at all times.

Operating controls for the primary power source, secondary power sources, and hydraulic motors, as well as for the lifting and lowering mechanism of the generator, are all centrally located on an instrument panel, generally designated as 70, inside the driver's cab 72. Actuation of cylinders 28 and 30 is accomplished with the aid of a conventional steering wheel 74. Acceleration is controlled by a foot pedal 76 which regulates the flow of hydraulic fluid to motors 56 and 58.

When unit 10 must be parked in a stationary location, a mechanical emergency brake locks the drive wheels to prevent them from turning. When the vehicle is moving and it is desired to stop, the throttle is deactuated. So long as the unit remains in motion, dynamic braking is provided by the hydraulic drive motors. Dynamic braking is a very important feature. Without it, inertia of the unit would require a very long stopping distance if only mechanical brakes were available.

In operation, the seismic signal generator moves to a preselected location. Bed plate 38 of the generator is lowered to engage the earth's surface. Static loading is applied to the generator bed plate 38 by using lifting means 42 as a jack to raise two wheels of the unit from the ground by a preselected height. After the requisite static loading has been applied to the generator's bed plate, a suitable seismic signal is injected into the ground. Upon completion of the seismic signal injection, the front wheels of the unit are lowered to the ground. Then the bed plate is retracted and the unit moved to a new location where the operating cycle is repeated.

This invention has been discussed with particular reference to a vibrator-type seismic signal generator. It will be apparent to those skilled in the art, that other types of signal generators can be used equally well, and the invention is to be limited only by the claims attached hereto.

What is claimed is:

1. In combination, a seismic vibrator having a base plate movable in a vertical direction and being adapted to engage the earth's surface; and
    a self-propelled vehicle for transporting and for adding inertia mass to said base plate when vibrating,
    said vehicle comprising a first bed frame defining a central open area adapted to movably receive therein said vibrator, a driver's cab on said first frame;
    a second bed frame, a primary power source and two hydraulic pumps mounted on said second frame, said pumps being driven by said primary power source;
    a pair of axles on each bed frame, a wheel mounted on each axle,
    drive means, including a differential transmission and a hydraulic motor for supplying power to each pair of axles,
    said hydraulic pumps supplying hydraulic power to drive the motor on each bed frame whereby each motor is independently powered;
    horizontal pivot means for pivotally interconnecting said bed frames for relative rotation about said horizontal pivot means, vertical pivot means for pivotally interconnecting said frames for relative rotation about said vertical pivot means;
    a pair of hydraulic lifting cylinders on said first bed frame for raising and lowering said vibrator;
    steering means, including two hydraulic steering cylinders interconnecting said bed frames on opposite sides of said horizontal pivot means for rotating said frames relative to each other about said vertical pivot means;
    said hydraulic pumps supplying power to said lifting cylinders and said steering cylinders;
    operating controls inside said driver's cab for controlling said: primary power source, hydraulic pumps, hydraulic motors, steering cylinders and lifting cylinders;
    said base plate when lowered by said lifting cylinders to engage the earth's surface causing said first bed frame to become raised by a preselected height to supply static loading to said base plate, and
    means for vibrating said base plate to thereby inject a seismic signal into the ground.

2. The combination of claim 1 wherein said vertical pivot means and said horizontal pivot means are substantially midway between said pairs of axles whereby the radius of turn for each bed frame is substantially the same, thereby allowing the wheels of the second bed frame to track in the same path taken by the wheels of the first bed frame.

\* \* \* \* \*